United States Patent
Liu et al.

(10) Patent No.: US 11,166,305 B2
(45) Date of Patent: Nov. 2, 2021

(54) METHOD OF RECEIVING INFORMATION, METHOD OF SENDING INFORMATION, TERMINAL AND BASE STATION

(71) Applicant: VIVO MOBILE COMMUNICATION CO., LTD., Chang'an Dongguan (CN)

(72) Inventors: Siqi Liu, Chang'an Dongguan (CN); Zichao Ji, Chang'an Dongguan (CN); Wei Bao, Chang'an Dongguan (CN); Qian Zheng, Chang'an Dongguan (CN); Yu Ding, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/639,993

(22) PCT Filed: Aug. 7, 2018

(86) PCT No.: PCT/CN2018/099116
§ 371 (c)(1),
(2) Date: Feb. 18, 2020

(87) PCT Pub. No.: WO2019/033953
PCT Pub. Date: Feb. 21, 2019

(65) Prior Publication Data
US 2020/0205186 A1 Jun. 25, 2020

(30) Foreign Application Priority Data
Aug. 18, 2017 (CN) .......................... 201710714076.4

(51) Int. Cl.
*H04W 4/00* (2018.01)
*H04W 72/12* (2009.01)

(52) U.S. Cl.
CPC ................. *H04W 72/1289* (2013.01)

(58) Field of Classification Search
USPC .................... 370/330, 329, 328, 331
See application file for complete search history.

(56) References Cited

U.S. PATENT DOCUMENTS

2017/0359835 A1   12/2017  Seo et al.
2018/0167946 A1*   6/2018  Si ........................ H04L 1/0061
(Continued)

FOREIGN PATENT DOCUMENTS

CN    107113538 A    8/2017
EP    3515123 A1     7/2017
(Continued)

OTHER PUBLICATIONS

European Search Report Application No. 18845721.2; dated Jun. 26, 2020.
(Continued)

*Primary Examiner* — David Q Nguyen
(74) *Attorney, Agent, or Firm* — von Briesen & Roper, s.c.

(57) ABSTRACT

A method of receiving information, a method of sending information, a terminal, and a base station are provided. The method of receiving information is applied to a terminal, and includes: acquiring monitoring assistance information of a PDCCH used to schedule RMSI; monitoring, according to the monitoring assistance information, the PDCCH used to schedule the RMSI, and receiving a corresponding RMSI.

20 Claims, 7 Drawing Sheets

(56) References Cited

U.S. PATENT DOCUMENTS

2018/0192383 A1* 7/2018 Nam .................. H04J 11/00
2019/0357185 A1* 11/2019 Kwak ................ H04L 5/0094

FOREIGN PATENT DOCUMENTS

WO    WO 2017/123045 A1    8/2017
WO    WO-2018128427 A1 *  7/2018   ............ H04W 48/12

OTHER PUBLICATIONS

International Search Report & Written Opinion related to Application No. PCT/CN2018/099116; dated Sep. 27, 2018.
CATT; "Discussion on multi-beam operation for NR-PDCCH"; 3GPP TSG RAN WG1 NR Ad-Hoc#2, R1-1710078, Qingdao, P.R. China Jun. 27-30, 2017.
Qualcomm Incorporated; "Remaining system information delivery consideration"; 3GPP TSG-RAN WG1 NR#2, R1-1711142, Qingdao, P.R. China Jun. 27-30, 2017.
Ericsson; "NR-PBCH Content and payload size"; 3GPP TSG RAN WG1 NR Ad-Hoc#2, R1-1711374, Qingdao, P.R. China Jun. 27-30, 2017.
Huawei, Hisilicon, "RMSI delivery"; 3GPP TSG RAN WG1 Meeting #91, R1-1719372, Reno, USA, Nov. 27-Dec. 1, 2017.
Qualcomm Incorporated; "Remaining system information delivery consideration"; 3GPP TSG-RAN WG1 NR#90, R1-1713376, Prague, Czech Republic, Aug. 21-25, 2017.
Huawei, Hisilicon, "NR RMSI delivery"; 3GPP TSG RAN WG1 Meeting #90, R1-1712147, Prague, Czech Republic, Aug. 21-25, 2017.
Huawei, Hisilicon, "Discussion on NR RMSI delivery"; 3GPP TSG RAN WG1 NR Ad Hoc Meeting, R1-1709916, Qingdao, China Jun. 27-30, 2017.

* cited by examiner

METHOD OF RECEIVING INFORMATION, METHOD OF SENDING INFORMATION, TERMINAL AND BASE STATION

CROSS-REFERENCE TO RELATED APPLICATION

This application is a U.S. national phase application of a PCT Application No. PCT/CN2018/099116 filed on Aug. 7, 2018, which claims a priority to Chinese Patent Application No. 201710714076.4, filed in China on Aug. 18, 2017, the disclosure of which is incorporated herein by reference in its entirety.

TECHNICAL FIELD

The present disclosure relates to the field of communication technology, and in particular, relates to a method of receiving information, a method of sending information, a terminal and a base station.

BACKGROUND

In a design of a New Radio (NR) system, for a purpose of an initial access, a Radio Resource Management (RRM) measurement, etc., an NR base station needs to send a Synchronization Signal Block (SS block) for a terminal to perform measurement and detection. An SS block consists of an NR-SS and a New Radio Physical Broadcast Channel (NR-PBCH). A plurality of SS blocks form a Synchronization Signal Block set (SS burst set). The maximum number of the SS blocks included in an SS burst set is related to a carrier frequency used by the network, details are as follows:

In a case that the frequency is less than 3 GHz, an SS burst set may include up to 4 SS blocks;

In a case that a range of the carrier frequency is 3 GHz to 6 GHz, an SS burst set may include up to 8 SS blocks;

In a case that a range of the carrier frequency is 6 GHz to 52.6 GHz, an SS burst set may include up to 64 SS blocks.

The period of the SS burst set may be configured as {5, 10, 20, 40, 80, 160} milliseconds. No matter what the period of the SS burst set is set to be, all SS blocks in an SS burst set must be sent within a time window of 5 milliseconds.

The period of the NR-PBCH is 80 ms, a plurality of SS burst sets are repeatedly sent in the period of the NR-PBCH. That is, in the period of the NR-PBCH, contents of SS blocks having the same index in these SS burst sets are consistent, so that users can support soft-combining and coverage enhancement. Contents of the NR-PBCH may change in different periods.

In a case that the frequency is less than 3 GHz, an SS burst set may include up to 4 SS blocks. In a case that the period of the SS burst set is 20 ms, for example, relationship between the period of the NR-PBCH, the SS block, and the SS burst set is illustrated in FIG. 1.

In the NR, minimum system information necessary for the initial access is divided into two parts. One part is called a Master Information Block (MIB) and is carried by the NR-PBCH; the other part is called Remaining Minimum System Information (RMSI). A Physical Downlink Control Channel (PDCCH) used to schedule the RMSI is located in a Control Resource Set (CORESET). Configuration information of the CORESET is carried by the MIB. Therefore, after the terminal receives and decodes an SS block, the terminal may, according to the acquired configuration information of the CORESET in the MIB, search for and detect whether or not there is a PDCCH used to schedule RMSI transmission, and receive the RMSI at the corresponding position according to a monitored PDCCH indication.

As shown in FIG. 2, it is assumed that the CORESET indicated in the MIB is fixed at the first 2 to 3 symbols of a slot where the SS block is located, that is, there is a PDCCH used to schedule the RMSI in the CORESET that is in the same slot as the SS block.

In the related art, some links among the SS block, the CORESET and the RMSI have not been determined, and a RMSI transmission mechanism including the period and a transmission time interval of the RMSI have not been determined. The period of the RMSI may not be consistent with the period of the NR-PBCH. Because the period of the RMSI and the period of a Physical Broadcast Channel (PBCH) may be different, not every SS block has a corresponding RMSI. For those slots without the RMSI and scheduling information of the RMSI, monitoring the PDCCH is not necessary.

However, if the user does not learn whether there is a PDCCH used to schedule the RMSI in the CORESET within the current slot, or does not learn information such as the position of the PDCCH used to schedule the RMSI, the user needs to try, after receiving the SS block, to search and detect the PDCCH in the CORESET indicated by the SS block within each slot. That is, the PDCCH must be monitored all the time, and this behavior consumes power severely.

SUMMARY

A method of receiving information is provided by some embodiments of the present disclosure. The method is applied to a terminal and includes: acquiring monitoring assistance information of a physical downlink control channel (PDCCH) used to schedule remaining minimum system information (RMSI); monitoring, according to the monitoring assistance information, the PDCCH used to schedule the RMSI, and receiving a corresponding RMSI.

A method of sending information is further provided by some embodiments of the present disclosure. The method is applied to a base station and includes: sending, to one or more terminals, monitoring assistance information of a physical downlink control channel (PDCCH) used to schedule remaining minimum system information (RMSI).

A terminal is further provided by some embodiments of the present disclosure. The terminal includes: an acquiring module, used to acquire monitoring assistance information of a physical downlink control channel (PDCCH) used to schedule remaining minimum system information (RMSI); a monitoring and reception module, used to monitor, according to the monitoring assistance information, the PDCCH used to schedule the RMSI, and receive a corresponding RMSI.

A terminal is further provided by some embodiments of the present disclosure. The terminal includes a storage, a processor, and a program stored on the storage and executable by the processor, wherein when the program is executed by the processor, the processor implements steps of the method of receiving information.

A computer readable storage medium is further provided by some embodiments of the present disclosure. The computer readable storage medium includes a program stored on the computer readable storage medium; when the program is executed by a processor, the processor implements steps of the method of receiving information.

A base station is further provided by some embodiments of the present disclosure. The base station includes a first sending module, used to send, to one or more terminals, monitoring assistance information of a physical downlink control channel (PDCCH) used to schedule remaining minimum system information (RMSI).

A base station is further provided by some embodiments of the present disclosure. The base station includes a storage, a processor, and a program stored on the storage and executable on the processor, wherein when the program is executed by the processor, the processor implements steps of the method of sending information.

A computer readable storage medium is further provided by some embodiments of the present disclosure. The computer readable storage medium includes a program stored on the computer readable storage medium; when the program is executed by a processor, the processor implements steps of the method of sending information.

DETAILED DESCRIPTION

In order to make objectives, technical solutions and advantages of the present disclosure clearer, the present disclosure will be completely described in detail below with reference to drawings of the specific embodiments. "And/or" in the specification and claims means at least one of objects before and after the "and/or".

The present disclosure provides a method of receiving information, a method of sending information, a terminal, and a base station for addressing a problem that the terminal always needs to perform blind detection of the PDCCH, in a case that the terminal may not be aware of information such as a PDCCH position, etc., causing a large power consumption of the terminal.

Figure 1:
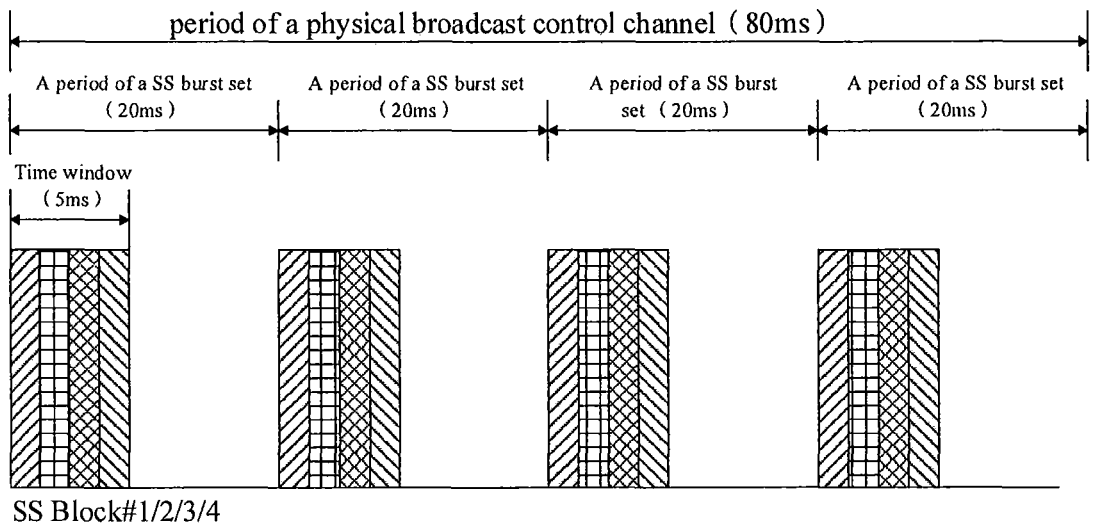
FIG. 1 is a schematic diagram of relationship among an NR-PBCH cycle, an SS block, and an SS burst set.
Figure 2:
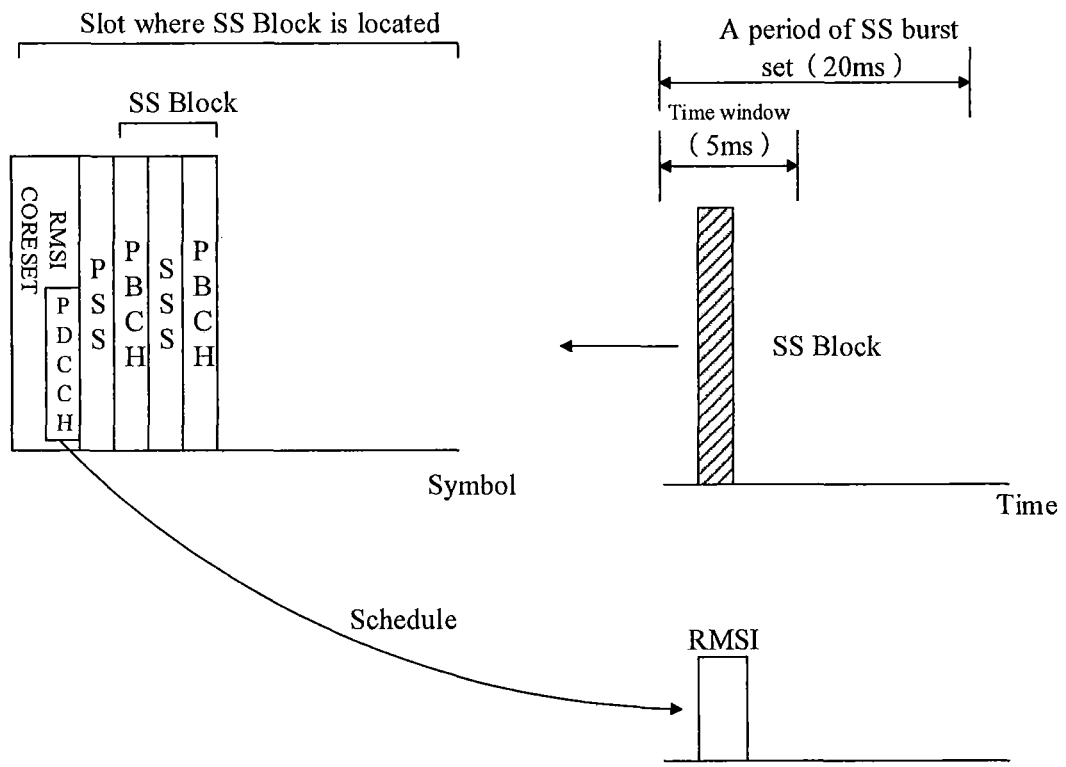
FIG. 2 is a schematic diagram of indicating a PDCCH used to schedule an RMSI in a CORESET.
Figure 3:
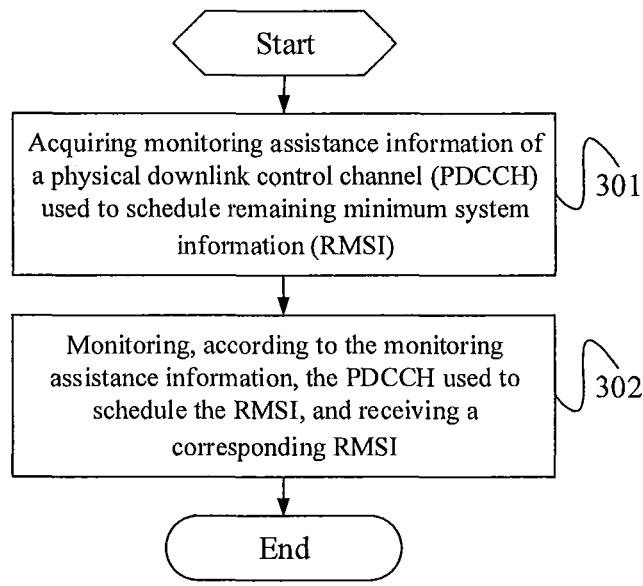
FIG. 3 is a schematic flowchart of a method of receiving information according to some embodiments of the present disclosure.

As shown in FIG. 3, a method of receiving information is provided by some embodiments of the present disclosure. The method is applied to a terminal and includes the following steps 301 to 302.

Step 301: acquiring monitoring assistance information of a physical downlink control channel (PDCCH) used to schedule remaining minimum system information (RMSI).

It should be noted that the monitoring assistance information includes preset parameters, and/or one or more resource indicators of the PDCCH used to schedule the RMSI and selected by the base station; the preset parameters include at least two of the period of the RMSI, a transmission interval of the RMSI, a length of a monitoring window of the PDCCH, and an offset of the monitoring window of the PDCCH.

Step 302: monitoring, according to the monitoring assistance information, the PDCCH used to schedule the RMSI, and receiving a corresponding RMSI.

The terminal monitors scheduling information (it should be noted that, the scheduling information is usually carried by the PDCCH used to schedule the RMSI, and the scheduling information is usually located in downlink control information, so the terminal also acquires the scheduling information of the RMSI in a case that the terminal monitors the downlink control information) of the RMSI according to a PDCCH position indicated by the monitoring assistance information, and receives the RMSI according to an indication of the scheduling information, thereby ensuring that the terminal monitors the PDCCH only at the indicated position, and avoiding unnecessary blind detection of the PDCCH performed by the terminal.

Specifically, specific implementation of Step 301 includes: acquiring default monitoring assistance information of the PDCCH used to schedule the RMSI; and/or receiving the monitoring assistance information of the PDCCH sent by the base station and used to schedule the RMSI.

It should be noted that, the terminal may directly acquire, according to an agreement of a communication protocol, the monitoring assistance information of the PDCCH used to schedule the RMSI, and the monitoring assistance information in this case is called default monitoring assistance information; the terminal may also acquire the monitoring assistance information configured on the base station side, and the monitoring assistance information is configured by the base station side and sent to the terminal. It should also be noted that, in a specific implementation, a plurality of pieces of monitoring assistance information may be specified in the communication protocol, wherein, one of the plurality of pieces of monitoring assistance information may be determined as the default monitoring assistance information, and the terminal is instructed to use this default monitoring assistance information in a case that the base station does not send configured monitoring assistance information. In a case that the base station sends the monitoring assistance information to the terminal, the base station may select one of the plurality of pieces of monitoring assistance information specified in the communication protocol as the monitoring assistance information configured for the terminal, and send the monitoring assistance information to the terminal.

The monitoring assistance information is regarded as a whole in the above manner of default monitoring assistance information and the manner of sending the monitoring assistance information by the base station, that is, all parameters included in the monitoring assistance information are configured in a default manner, or all parameters included in the monitoring assistance information are configured by the base station. It should also be noted that, in order to improve flexibility of the configuration, some parameters included in the monitoring assistance information may be configured in the default manner, and remaining parameters included in the monitoring assistance information may be configured by the base station.

Specifically, in a case that the base station is required to configure at least one parameter in the monitoring assistance information, the step of receiving the monitoring assistance information, sent by the base station, of the PDCCH used to schedule the RMSI includes: receiving the at least one parameter in the monitoring assistance information sent through a preset message by the base station.

The preset message includes at least one of: a master information block (MIB), one or more system information blocks other than the MIB, and radio resource control (RRC) signaling.

It should be noted that, the at least one parameter in the monitoring assistance information is indicated in an explicit and/or implicit manner through the preset message.

Specifically, the explicit indication manner through the preset message includes: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

The following describes the above explicit indication manner by taking as an example that the MIB is used to send the monitoring assistance information.

A field in the MIB is used to indicate: one configuration from preset following items: a transmission interval of the RMSI, a plurality of periods of the RMSI, the length of the monitoring window of the PDCCH, an offset of the monitoring window of the PDCCH, and one or more resource indicators of a PDCCH used to schedule the RMSI, is selected by the base station. An index corresponding to the configuration is placed in the MIB, thereby explicitly indicating the terminal. After the terminal receives the MIB, the terminal may learn information such as the period of the RMSI, the transmission interval of the RMSI, the length of the monitoring window of the PDCCH, the offset of the monitoring window of the PDCCH, and the one or more resource indicators of the PDCCH used to schedule the RMSI and selected by the base station.

For example, assuming that an X-bit index is used to jointly explicitly indicate, in a case that this indication is 11 which means that the period of the RMSI is 320 ms, the transmission interval of the RMSI is 80 ms, the length of the monitoring window of the PDCCH is 1 ms, and the offset is 0 ms (in this example, the one or more resource indicators of the PDCCH used to schedule the RMSI and selected by the base station are omitted here).

For example, assuming that a plurality of indexes are used to explicitly indicate the parameters respectively; the period of the RMSI has x configurations, and a second configuration (a corresponding index is set to 10) is used by the network; the transmission interval has Y configurations, and a third configuration is used by the network (a corresponding index is set to 11); the length of the window has Z configurations, and the second one is used (a corresponding index is set to 10), etc.

Specifically, the implicit indication manner through the preset message includes: indicating the at least one parameter in the monitoring assistance information by using preset information in the preset message.

The preset information has correspondence relationship with the at east one parameter in the monitoring assistance information.

Optionally, the preset information includes: the period of a synchronization signal block burst set (SS burst set).

The following describes the above implicit indication manners by taking as an example that the MIB is used to send the monitoring assistance information.

Correspondence relationship among different periods of the SS burst set, different periods of the RMSI, the transmission interval of the RMSI, configuration of the length of the monitoring window of the PDCCH, the offset of the monitoring window of the PDCCH and the one or more resource indicators of the PDCCH used to schedule the RMSI and selected by the base station and is established, thereby implementing the implicit indication manner; so that the terminal may learn the period of the RMSI, the transmission interval of the RMSI, the length of a monitoring window of the PDCCH, the offset of the monitoring window of the PDCCH, and the one or more resource indicators of the PDCCH used to schedule the RMSI and selected by the base station, according to an indication of the period of the SS burst set, after the terminal receives the MIB. For example, an indication of the period of the SS burst set is 011, which indicates that the period of the SS burst set is 20 ms, and simultaneously implicitly indicates that the period of the RMSI is 320 ms, the transmission interval of the RMSI is 80 ms, the length of the monitoring window of the PDCCH is 20 ms, and the offset of the monitoring window of the PDCCH is 0 ms (in this example, the one or more resource indicators of the PDCCH used to schedule the RMSI and selected by the base station is omitted here).

It should be noted that, in a case that parameters included in the monitoring assistance information are different, manners of monitoring the PDCCH by the terminal may also be different. In a case that the monitoring assistance information includes one or more resource indicators of the PDCCH used to schedule the RMSI and selected by the base station, a monitoring behavior of the terminal specifically includes: performing, according to the one or more resource indicators of PDCCH, PDCCH detection on a PDCCH resource selected by the base station. In a case that the monitoring assistance information includes the length of the monitoring window of the PDCCH and the offset of the monitoring window of the PDCCH, the monitoring behavior of the terminal specifically includes: finding a starting point of the monitoring window of the PDCCH according to the offset of the monitoring window of the PDCCH, starting the monitoring window of the PDCCH, searching and detecting the PDCCH in a control resource set within the monitoring window of the PDCCH, stopping searching and detecting the PDCCH in the control resource set after the monitoring window of the PDCCH ends. In a case that the monitoring assistance information includes the period of the RMSI and the transmission interval of the RMSI, the monitoring behavior of the terminal specifically includes: in the period of the RMSI, after the terminal receives an RMSI, not searching or detecting the PDCCH in the control resource set in a next transmission interval of the RMSI by the terminal, but searching and detecting the PDCCH in the control resource set after the transmission interval of the RMSI.

It should be noted that in a case that the terminal receives the RMSI, the terminal needs to decode the RMSI to acquire the contents of the RMSI. In order to further achieve the purpose of saving power of the terminal, the terminal stops receiving the RMSI and enters a sleep state, in a case that the terminal acquires the contents of the RMSI through decoding. Only in a case that system information or the contents of the RMSI changes, the terminal receives the RMSI again.

Based on this, the specific implementation of the embodiment of the present disclosure includes: decoding the RMSI according to the received RMSI; stopping receiving the RMSI after successfully acquiring contents of the RMSI through the decoding.

Specifically, the implementation of the decoding the RMSI according to the received RMSI includes: decoding the RMSI according to a received RMSI; or performing soft-combining and decoding on at least two received RMSIs.

In a case that the terminal may decode the content of a first received RMSI, the terminal stops receiving subsequent RMSIs. In a case that the terminal does not decode contents of the first received RMSI, the terminal needs to continue receiving subsequent RMSIs, and performs the soft-combining and joint decoding on a plurality of received RMSIs to acquire the contents of the RMSIs.

It should be noted that, the specific implementation in a case that the PDCCH carrying downlink control information is sent on the base station side includes: sending, in a case that only a single transmission position of the downlink control information is included in a preset time duration, the downlink control information at the transmission position, wherein this case illustrates that the position of the PDCCH sent to the terminal is fixed; or determining, in a case that at least two candidate positions of the downlink control information are included in a preset time duration, the transmission position of the downlink control information among the at least two candidate positions, and sending the downlink control information at the determined transmission position, wherein this case illustrates that the position where the position of PDCCH sent to the terminal is not fixed.

Specifically, in a case that the base station sends the RMSI, the base station may send at least one RMSI to the terminal according to a preset time interval. For example, the base station sends the RMSI at regular time intervals in the period of the RMSI; it is also possible that the base station sends at least one RMSI within a preset time window in the period of the RMSI. For example, the base station sends the RMSI at regular/irregular time intervals within 0 ms to 5 ms in the period of the RMSI.

Specific applications of the present disclosure in different situations are exemplified as follow.

It should be firstly noted that, in the present disclosure, a RMSI mechanism may have following characteristics.

1. Considering flexible scheduling of the RMSI, the RMSI may be repeatedly sent for multiple times within the period of the RMSI; or within the period of the RMSI, the RMSI may be repeatedly sent for multiple times within a system information time window within the period of the RMSI; positions of time and frequency of each RMSI may not be fixed. Under a condition that a channel quality is good enough, the terminal may successfully decode the contents of the RMSI by receiving one of the RMSIs within the period of the RMSI; if the terminal may not successfully decode the contents of the RMSI by receiving the one of the RMSIs within the period of the RMSI, the terminal performs soft-combining on subsequently received RMSIs to improve a coverage and a probability of successful decoding.

2. Correspondingly, a time position of the PDCCH used to schedule the RMSI may be fixed, such as fixed in the first 2 to 3 symbols of the slot where the SS block is located, or may not be fixed, for example, there are a plurality of PDCCHs or candidate positions of the PDCCH in a monitoring window of the PDCCH.

3. It is considered that there are many possible values for the period of the RMSI, such as {80 ms, 160 ms, 320 ms . . . }. There are also many possible values for the transmission time interval of the RMSI that is repeatedly sent for multiple times. Lengths of the above monitoring window of the PDCCH and the system information time window may also have a plurality of possible values.

As mentioned above, there may be the following two cases caused by configurations of the base station in which the period of the SS burst set and the transmission interval of the RMSI are different since the period of the PBCH and the period of the RMSI are different.

A. Not every SS block in the SS burst set has a corresponding RMSI, that is, there is no PDCCH used to schedule the RMSI in the control resource set (CORESET) corresponding to the SS block in some SS burst sets;

B. The SS block in each SS burst set has a corresponding RMSI.

it should be noted that, following Cases 1 and 2 respectively illustrate the above two different cases A and B under assumptions of a fixed time position of the PDCCH and a fixed period of the RMSI. The two cases A and B may also exist in application scenarios in other cases, which will not be described further.

Case 1

A scenario, where a base station desires a short access delay, frequent broadcast information, and the fixed time position of the PDCCH used to schedule the RMSI, is considered. It is assumed that the period of the SS burst set is 10 ms, the period of the RMSI is 80 ms, a value of the transmission interval of the RMSI is 20 ms, and the base station sends an RMSI every 20 ms within the period 80 ms of the RMSI. Thus, the SS block in each SS burst set may or may not have a corresponding RMSI. The time position of the PDCCH used to schedule the RMSI is fixed in the first 2 to 3 symbols of the slot where the SS block is located. The base station sends, through the MIB to the terminal, the monitoring assistance information of the PDCCH used to schedule the RMSI.

Figure 4:
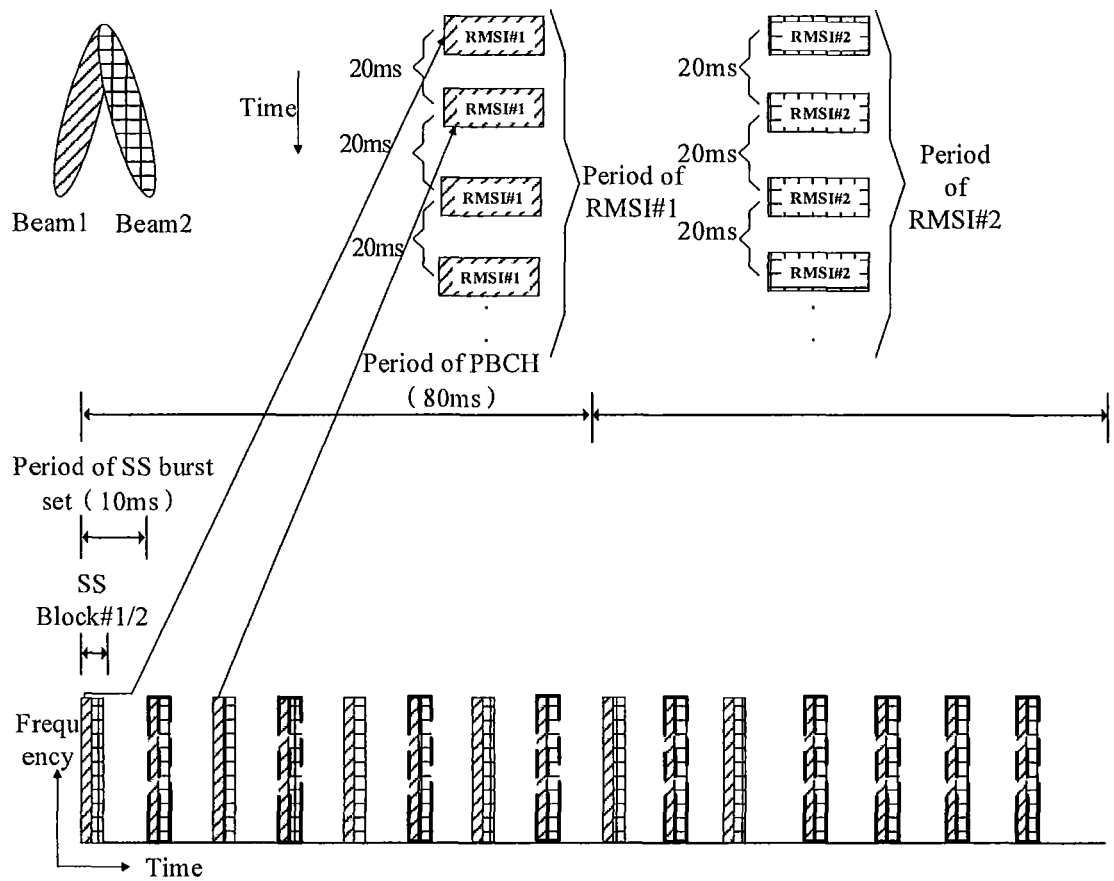
FIG. 4 is a schematic diagram of scheduling an RMSI in case 1.

As shown in FIG. 4, a solid square represents that the SS block indicates a CORESET, and the CORESET has a corresponding PDCCH used to schedule the RMSI; a dotted square represents that there is no corresponding PDCCH in the CORESET indicated by the SS block, and an RMSI may not be scheduled; an analysis to an SS block#1 of beam 1 is as follows.

Step 1: the terminal receives the SS block#1 in a first SS burst set in a first period of the PBCH and parses the MIB to acquire the configuration information of a CORESET of an RMSI#1 and the monitoring assistance information of the PDCCH. The terminal learns that a time-frequency position of the CORESET of the RMSI#1 is located in the first 2 to 3 symbols of the same slot as that for SS block#1, the period of the RMSI#1 is 320 ms, and the transmission interval of the RMSI#1 is 80 ms.

Step 2: the terminal searches and detects the PDCCH in the CORESET of the corresponding RMSI#1 according to configuration information of the CORESET of the RMSI#1 acquired from the MIB, and receives the RMSI#1 according to the acquired PDCCH, but the RMSI#1 is not successfully parsed.

It should be noted that, since the transmission interval of the RMSI is 20 ms in this case, which is greater than the period 10 ms of the SS burst set and means that the CORESET of the RMSI#1 indicated by the SS block in the second SS burst set does not have the PDCCH used to schedule the RMSI#1, the terminal may not search or detect the CORESET of the RMSI#1.

Step 3: after 20 ms elapses, the terminal searches and detects the PDCCH in the CORESET of the next RMSI#1 within a corresponding slot, and receives the RMSI#1, but the terminal fails to parse the RMSI#1.

Step 4: after another 20 ms elapses, the terminal searches and detects the PDCCH in the CORESET of the still next RMSI#1 within the corresponding slot and receives the and successfully parses the RMSI#1.

Step 5: in this period of the RMSI#1, a plurality of RMSI#1 received by the terminal may be soft-combined. Once the terminal successfully parses the RMSI#1, the terminal enters a sleep state until the system information or the contents of the RMSI changes.

Case 2

An application scenario, i.e., a scenario where the base station desires a low signaling overhead, a large transmission period of broadcast information, and a fixed time position of the PDCCH used to schedule the RMSI, is considered. The period of the SS burst set is 80 ms, the period of the RMSI is 320 ms, a value of the transmission interval of the RMSI is 80 ms, and the base station sends an RMSI every 80 ms within the period 320 ms of the RMSI. It means that the SS block in each period of the SS burst set has a corresponding RMSI. The time position of the PDCCH used to schedule the RMSI is fixed in the first 2 to 3 symbols of the slot where the SS block is located. The base station sends, to the terminal through the MIB, the monitoring assistance information of the PDCCH used to schedule the RMSI.

Figure 5:
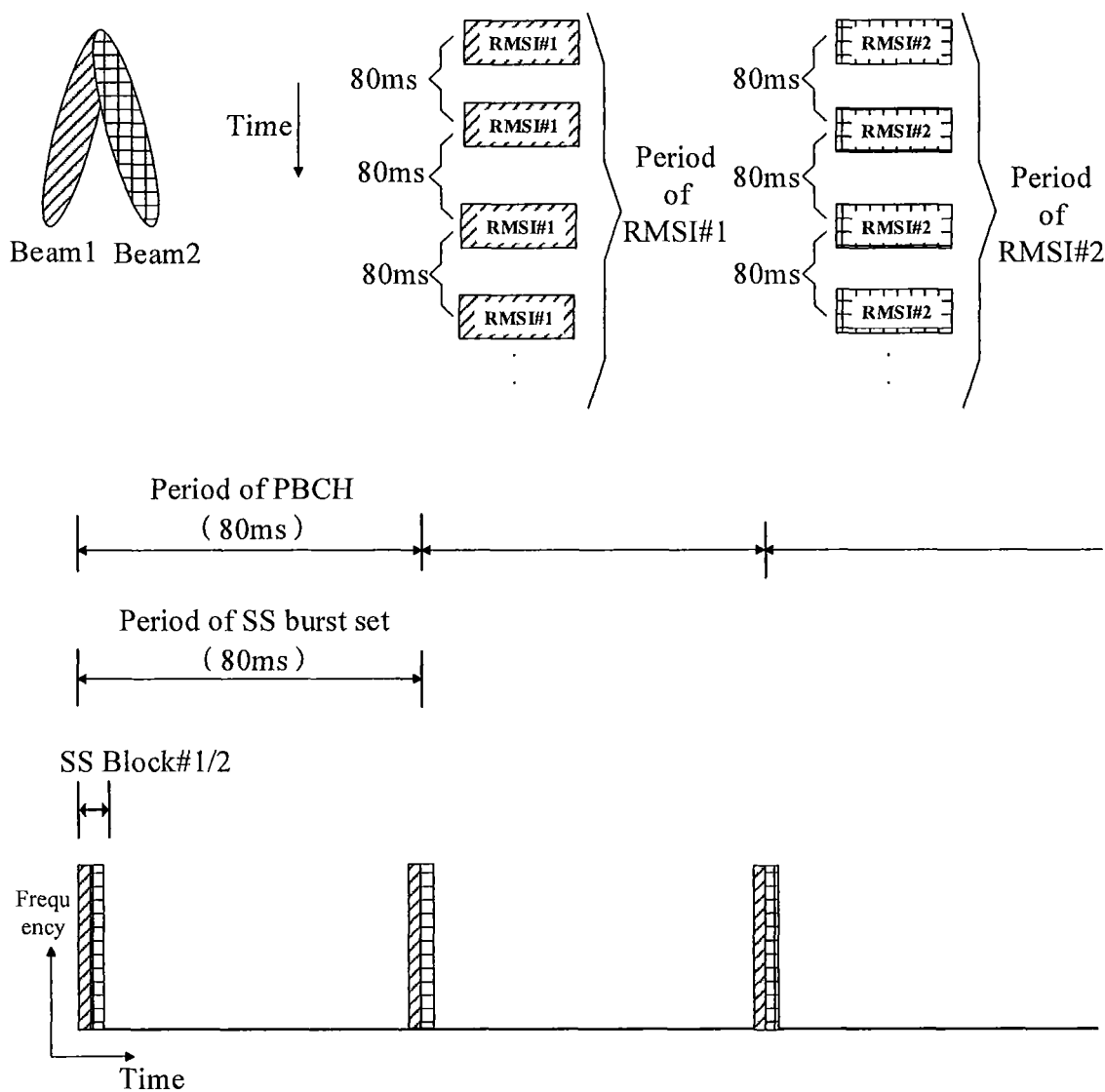
FIG. 5 is a schematic diagram of scheduling an RMSI in case 2.

As shown in FIG. 5, a solid square represents that the SS block indicates a CORESET, and there is a PDCCH used to schedule the RMSI in the CORESET; an analysis to the SS block#1 of beam 1 is as follows.

Step 1: the terminal receives the SS block#1 in the first SS burst set in the first period of the PBCH and parses the MIB to acquire the configuration information of the CORESET of the RMSI#1 and the monitoring assistance information of the PDCCH. The terminal learns that the time-frequency position of the CORESET of the RMSI#1 is located in the first 2 to 3 symbols of the same slot as that for SS block#1, the period of the RMSI #1 is 320 ms, and the transmission interval is 80 ms.

Step 2: the terminal searches and detects the PDCCH in the CORESET of the corresponding RMSI#1 according to the configuration information of the CORESET of the RMSI#1 acquired from the MIB, and receives the RMSI#1 according to the acquired PDCCH, but the RMSI#1 is not successfully parsed.

It should be noted that, since the transmission interval of the RMSI#1 is 80 ms in this case, it means that the CORESET of RMSI#1 indicated by the SS block in the second SS burst set has a PDCCH used to schedule the RMSI#1, the terminal searches and detects the CORESET of the RMSI#1.

Step 3: after 80 ms elapses, the terminal searches and detects the PDCCH in the CORESET of the next RMSI#1 within the corresponding slot, and receives the RMSI#1 but fails to parse the RMSI#1.

Step 4: after another 80 ms elapses, the terminal searches and detects the PDCCH in the CORESET of the still next RMSI#1, within the corresponding slot, and receives the RMSI#1.

Step 5: in the period of the RMSI#1, a plurality of RMSI#1 received by the terminal may be soft-combined. Once the terminal receives and successfully parses the RMSI#1, the terminal enters a sleep state until the system information or the contents of the RMSI changes.

It should be noted that, the monitoring behaviors of the terminal in the case 1 and the case 2 correspond to the monitoring behavior used by the terminal in a case that the monitoring assistance information includes the period of the RMSI and the transmission interval of the RMSI.

Case 3

An application scenario, i.e., a scenario where a base station desires a short access delay and frequent broadcast information, is considered. It is assumed that the period of the RMSI is 80 ms, a value of the transmission interval of the RMSI is 20 ms, and the base station sends an RMSI every 20 ms within the period 80 ms of the RMSI. The period of the SS burst set is 10 ms. A time position of the PDCCH used to schedule the RMSI is not fixed. For example, there are a plurality of candidate time positions of PDCCH within a time window W, but the base station only selects one of the plurality of candidate time positions to send the PDCCH. This means that a length of a monitoring window of the PDCCH is equal to a length of the time window W.

Assuming that the PDCCH used to schedule the RMSI has two candidate time positions (denoted as a, b) within a window of 10 ms, the base station may select one of these positions of PDCCH to schedule the RMSI. The terminal needs to monitor the 10 ms to ensure that the PDCCH selected by the base station may be monitored, so the length of the monitoring window may be set to 10 ms. It is assumed that a starting point of the window of 10 ms is aligned with a starting point of the period of the SS burst set, and an offset of the monitoring window of the PDCCH is 0 ms.

Figure 6:
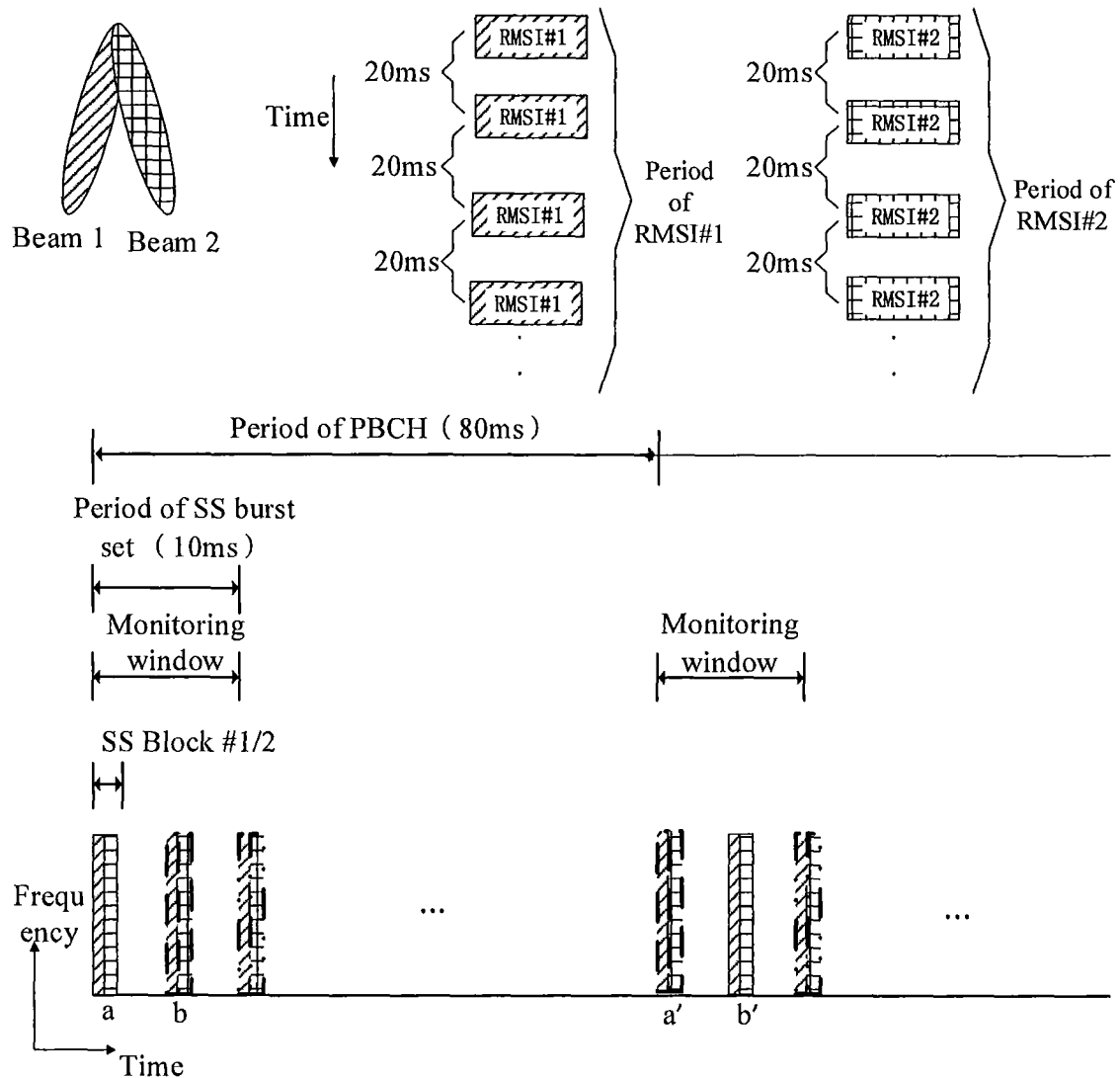
FIG. 6 is a schematic diagram of scheduling an RMSI in case 3 and in case 4.

As shown in FIG. 6, a solid square represents that the SS block has a corresponding CORESET, and the CORESET has a corresponding PDCCH which may be used to schedule the RMSI; a dash-dotted square represents that there is no corresponding PDCCH in the CORESET of the RMSI indicated by the SS block, and RMSI may not be scheduled; a dotted square represents a candidate time position of the PDCCH. The following analyzes the SS block#1 of the beam 1 as follows.

Step 1: the base station notifies the monitoring assistance information of the PDCCH used to schedule the RMSI#1, and the terminal acquires the information.

Step 2: the terminal determines a starting point of the monitoring window according to offset of the monitoring window of the PDCCH, and starts the monitoring window of the PDCCH. In such a case, the base station schedules the RMSI#1 by using the PDCCH at the position a. The terminal detects the PDCCH "a" in the window and receives the RMSI#1 but fails to parse the RMSI#1.

Step 3: after the monitoring window of the PDCCH ends, the terminal no longer attempts to detect the CORESET of the RMSI#1, waits for 20 ms to elapse, starts a next monitoring window of the PDCCH, and restarts to searching and detecting the CORESET of the RMSI#1. In such a case, the base station uses the PDCCH at the position "b" to schedule the RMSI#1. The terminal detects the PDCCH "b'" within the window, receives the RMSI#1, and successfully parses the RMSI#1.

Step 4: in the period of the RMSI#1, a plurality of RMSI#1, received by the terminal may be soft-combined. Once the terminal receives and successfully parses the RMSI#1, the terminal enters a sleep state until the system information or the contents of the RMSI changes.

It should be noted that, the monitoring behavior of the terminal in the Case 3 corresponds to the monitoring behavior used by the terminal in cases that the monitoring assistance information includes the length of the monitoring window of the PDCCH and the offset of the monitoring window of the PDCCH, and that the monitoring assistance information includes the period of the RMSI and the transmission interval of the RMSI.

Case 4

An application scenario, i.e., a scenario where a base station desires a short access delay and frequent broadcast information, is considered. It is assumed that the period of the RMSI is 80 ms, a value of the transmission interval of the RMSI is 20 ms, and the base station sends an RMSI every 20 ms within the period 80 ms of the RMSI. The period of the SS burst set is 10 ms. The time position of the PDCCH used to schedule the NMSI is not fixed: the PDCCH used to schedule the RMSI has two candidate time positions (denoted as a, b) within a window of 10 ms, the base station may select one of these time positions of the PDCCH to schedule the RMSI, and the monitoring assistance information of the PDCCH sent to the terminal includes an indication of a PDCCH resource selected by the base station. It is assumed that a starting point of the window of 10 ms is aligned with a starting point of the period of the SS burst set. In such a case, it means that the terminal only needs to perform detection at the indicated position of the PDCCH without continuously monitoring the entire monitoring window of the PDCCH.

Continuing as shown in FIG. 6, analysis is performed on the SS block 1 of the beam 1.

Step 1: the base station notifies the monitoring assistance information of the PDCCH used to schedule the RMSI#1, and the terminal acquires the information.

Step 2: the terminal determines, through parsing the monitoring assistance information, a starting point of the monitoring window of the PDCCH according to an offset of the monitoring window of the PDCCH, and starts the monitoring window, and learns from the monitoring assistance information that the base station schedules the RMSI#1 by using the PDCCH at the position "a". Therefore, the terminal detects the PDCCH only at the position "a".

Step 3: after the monitoring window of the PDCCH ends, the terminal no longer attempts to detect the CORESET of the RMSI#1. The terminal waits for 20 ms to elapse, starts the next monitoring window of the PDCCH, and restarts detecting the CORESET of the RMSI#1, and learns from the assistance information that the base station schedules the RMSI#1 by using the PDCCH at the position "b"'. The terminal only detects PDCCH "b"' and receives the RMSI#1, and then successfully parses the RMSI#1.

Step 4: in the period of the NMSI#1, a plurality of RMSI#1 received by the terminal may be soft-combined. Once the terminal receives and successfully parses the RMSI#1, the terminal enters a sleep state until the system information or the contents of the RMSI changes.

It should be noted that, the monitoring behavior of the terminal in the Case 4 corresponds to the monitoring behavior used by the terminal in cases that the monitoring assistance information includes one or more resource indicators of the PDCCH used to schedule the RMSI and selected by the base station, that the monitoring assistance information includes the period of the RMSI and a transmission interval of the RMSI, and that the monitoring assistance information includes a length of a monitoring window of the PDCCH and an offset of the monitoring window of the PDCCH.

Case 5

An application scenario: in the period of the RMSI, the RMSI is repeatedly sent for multiple times within a system information time window T, and the transmission time interval, a time position and a frequency position of each RMSI may not be fixed. The time position of the corresponding PDCCH used to schedule the RMSI is naturally not fixed. The length of the monitoring window is equal to the length of the system information time window T.

Assuming that the period of the RMSI is 320 ms, and the RMSI is sent twice within a system information time window T of 40 ms in the 320 ms. The RMSI is not sent within other parts out of the window in the period, the length of the monitoring window is set to 40 ms, the offset of the monitoring window is set, the terminal needs to monitor the PDCCH within this monitoring window. The base station notifies, through the MIB, the terminal of the monitoring assistance information of the PDCCH used to schedule the RMSI.

Figure 7:
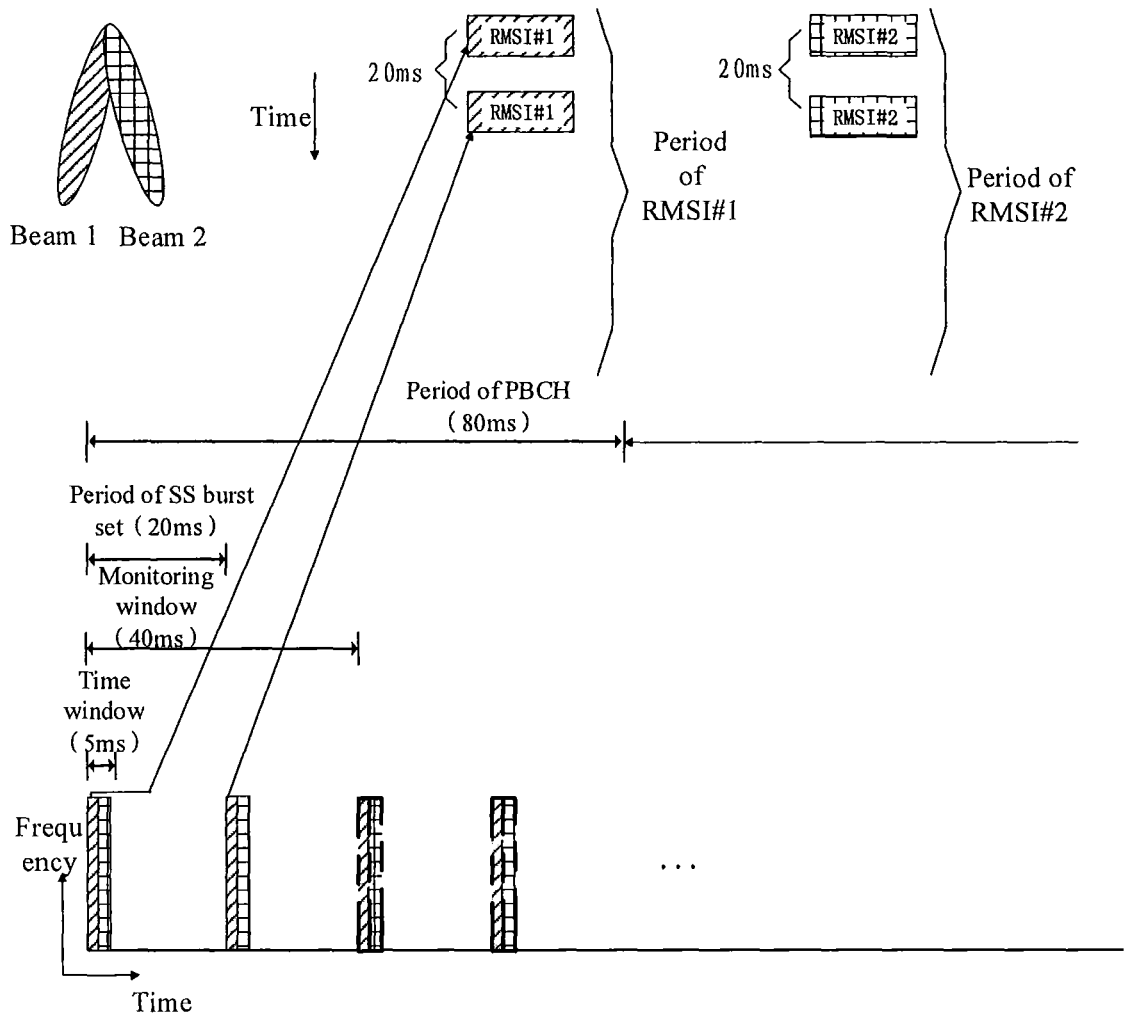
FIG. 7 is a schematic diagram of scheduling an RMSI in case 5.

As shown in FIG. 7, a solid square represents that the SS block has a corresponding CORESET, and the CORESET of the RMSI has an PDCCH used to schedule the RMSI; a dotted square represents that there is no corresponding PDCCH in the CORESET of the RMSI indicated by the SS block, and the RMSI may not be scheduled; an analysis to the SS block#1 of beam 1 is as follows.

Step 1: the terminal receives the SS block#1 in the first SS burst set of the first period of the PBCH and parses the MIB to acquire the configuration information of the CORESET of the RMSI#1 and the monitoring assistance information of the PDCCH. The terminal learns the time-frequency position of the CORESET of the RMSI#1, the period of the RMSI#1 is 320 ms, the length of the monitoring window of the PDCCH is 40 ms, and the offset of the monitoring window of the PDCCH.

Step 2: the terminal determines the starting position of the monitoring window of the PDCCH according to the offset of the monitoring window of the PDCCH, starts the monitoring window of the PDCCH, and continuously detects the CORESET of the RMSI#1 within the range of the monitoring window of the PDCCH and attempts to receive the RMSI#1, and the terminal may soft-combine a plurality of received RMSI#1.

Step 3: after the monitoring window of the PDCCH ends, the terminal enters a sleep state. In the monitoring window of the PDCCH, a plurality of the RMSI#1 received by the terminal may be soft-combined. Once the terminal receives and successfully parses the RMSI#1, the terminal may also directly enter a sleep state until the system information or the contents of the RMSI changes.

Case 6

The terminal adopts the default assistance configuration information of the PDCCH, and the base station may adopt a fixed or non-fixed period of the RMSI, a fixed or non-fixed transmission interval of the RMSI, a fixed or non-fixed transmission position of the PDCCH, and a fixed or non-fixed offset of the monitoring window of the PDCCH.

Step 1: the terminal adopts the default assistance configuration information of the PDCCH, and monitors the PDCCH according to the default period of the RMSI, a default transmission interval of the RMSI, a default length of the monitoring window of the PDCCH and a default offset, to acquire the RMSI.

Step 2: in the period of the RMSI, a plurality of RMSIs received by the terminal may be soft-combined. Once the terminal receives and successfully parses the RMSI, the terminal enters a sleep state, otherwise the terminal continues receiving the RMSI until the system information or the contents of the RMSI changes.

The method of receiving information of the present disclosure is mainly directed to a 5G communication system. The PDCCH used to schedule the RMSI is monitored through broadcast information by considering factors such as flexible configuration of the RMSI and flexible configuration of the PDCCH, etc., to avoid unnecessary monitoring of the PDCCH and to reduce the power consumption of the terminal.

Figure 8:
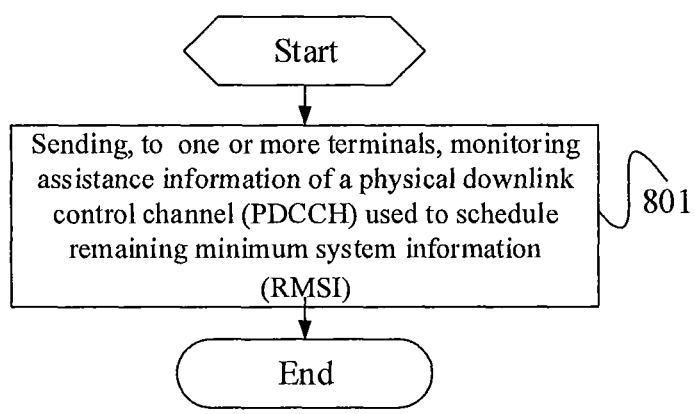
FIG. 8 is a schematic flowchart of a method of sending information according to some embodiments of the present disclosure.

As shown in FIG. 8, a method of sending information is provided in some embodiments of the present disclosure. The method is applied to a base station and includes a following Step 801.

Step 801: sending, to one or more terminals, monitoring assistance information of a physical downlink control channel (PDCCH) used to schedule remaining minimum system information (RMSI).

Specifically, the monitoring assistance information includes preset parameters and/or one or more resource indicators of the PDCCH used to schedule the RMSI and selected by the base station.

The preset parameters include at least two of: the period of the RMSI, a transmission interval of the RMSI, a length of a monitoring window of the PDCCH, and an offset of the monitoring window of the PDCCH.

Further, Step 801 includes: sending, to the one or more terminals through a preset message, at least one parameter in the monitoring assistance information.

The preset message includes at least one of: a master information block (MIB), one or more system information blocks other than the MIB, and radio resource control (RRC) signaling.

Specifically, the at least one parameter in the monitoring assistance information is indicated in an explicit and/or implicit manner through the preset message.

Further, the explicit indication manner through the preset message includes: jointly indicating the at least one parameter in the monitoring assistance information by using one or more first preset bits in the preset message, or indicating respectively the at least one parameter in the monitoring assistance information by using one or more second preset hits having a same number or different numbers in the preset message.

Further, the implicit indication manner through the preset message includes: indicating the at least one parameter in the monitoring assistance information by using preset information in the preset message.

The preset information has correspondence relationship with the at least one parameter in the monitoring assistance information.

Optionally, the preset information includes: the period of a synchronization signal block burst set (SS burst set).

Further, after Step 801, the method further includes: sending, to the one or more terminals, downlink control information used to schedule the RMSI.

The downlink control information is carried in the PDCCH used to schedule the RMSI, and the downlink control information is used to instruct the one or more terminals to receive RMSI.

Specifically, sending, to the one or more terminals, the downlink control information used to schedule the RMSI includes: sending, in a case that only a single transmission position of the downlink control information is included in a preset time duration, the downlink control information at the transmission position; or determining, in a case that at least two candidate positions of the downlink control information are included in a preset time duration, the transmission position of the downlink control information from the at least two candidate positions, and sending the downlink control information at the determined transmission position.

Further, after sending, to the one or more terminals, the downlink control information used to schedule the RMSI, the method further includes: sending at least one RMSI at a preset time interval; or sending at least one RMSI within a preset time window in the period of the RMSI.

It should be noted that all description about the base station side in the foregoing embodiments are applicable to the embodiments applied to the method of sending information at the base station side, and the same technical effects can also be achieved.

Figure 9:
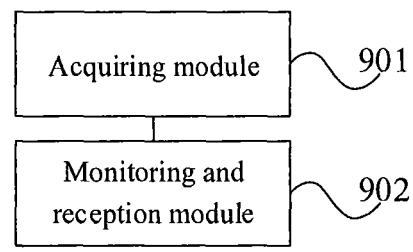
FIG. 9 is a schematic diagram illustrating modules of a terminal according to some embodiments of the present disclosure.

As shown in FIG. 9, a terminal is provided in some embodiments of the present disclosure. The terminal includes an acquiring module 901, and a monitoring and reception module 902.

The acquiring module 901 is used to acquire monitoring assistance information of a physical downlink control channel (PDCCH) used to schedule remaining minimum system information (RMSI).

The monitoring and reception module 902 is used to monitor, according to the monitoring assistance information, the PDCCH used to schedule the RMSI, and receive a corresponding RMSI.

Specifically, the monitoring assistance information includes preset parameters and/or one or more resource indicators of the PDCCH used to schedule the RMSI and selected by the base station.

The preset parameters include at least two of: the period of the RMSI, a transmission interval of the RMSI, a length of a monitoring window of the PDCCH, and an offset of the monitoring window of the PDCCH.

Specifically, the acquiring module 901 is used to: acquire default monitoring assistance information of PDCCH used to schedule the RMSI; and/or receive the monitoring assistance information, sent by the base station, of the PDCCH used to schedule the RMSI.

Optionally, at least one parameter in the monitoring assistance information is sent by the base station; in a case that the acquiring module 901 receives the monitoring assistance information, sent by the base station, of PDCCH and used to schedule the RMSI, the acquiring module 901 is used to: receive the at least one parameter in the monitoring assistance information sent by the base station through a preset message, wherein, the preset message includes at least one of: a master information block (MIB), one or more system information blocks other than the MIB, and radio resource control (RRC) signaling.

Further, the at least one parameter in the monitoring assistance information is indicated in an explicit and/or implicit manner through the preset message.

Specifically, the explicit indication manner through the preset message includes: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

Specifically, the implicit indication manner through the preset message includes: indicating the at least one parameter in the monitoring assistance information by using preset information in the preset message.

The preset information has correspondence relationship with the at least one parameter in the monitoring assistance information.

Optionally, the preset information includes: the period of a synchronization signal block burst set (SS burst set).

Specifically, the terminal further includes: a decoding module, used to decode the RMSI according to the received RMSI; a processing module, used to stop receiving an RMSI after successfully decoding content of the RMSI.

Further, the decoding module is used to: decode the RMSI according to a received RMSI; or perform soft-combining and decoding on at least two received RMSIs.

Specifically, the terminal further includes: a re-reception module, used to re-receive the RMSI in a case that system information or the content of the RMSI changes.

In a case that the monitoring assistance information includes the one or more resource indicators of the PDCCH used to schedule the RMSI and selected by the base station and the monitoring and reception module monitors the PDCCH used to schedule the RMSI, the monitoring and reception module is used to: perform, according to the one or more resource indicators of the PDCCH, PDCCH detection on a PDCCH resource selected by the base station.

In a case that the monitoring assistance information includes the length of the monitoring window of the PDCCH and the offset of the monitoring window of the PDCCH, and the monitoring and reception module monitors the PDCCH used to schedule the RMSI, the monitoring and reception module is used to: find a starting point of the monitoring window of the PDCCH according to the offset of the monitoring window of the PDCCH, start the monitoring window of the PDCCH, search and detect the PDCCH in a control resource set within the monitoring window of the PDCCH, stop searching and detecting the PDCCH in the control resource set after the monitoring window of the PDCCH ends.

In a case that the monitoring assistance information includes the period of the RMSI and the transmission interval of the RMSI, the monitoring and reception module monitors the PDCCH used to schedule the RMSI, the monitoring and reception module is used to: in the period of the RMSI, after the terminal receives an RMSI, not search or detect the PDCCH in the control resource set in a next RMSI interval, but search and detect the PDCCH in a control resource set after a transmission interval of the RMSI.

It should be noted that the embodiment of the terminal is a terminal corresponding to the above-mentioned method of receiving information applied at a terminal side. All implementations of the above embodiments are applicable to the embodiment of the terminal, and the same technical effects may be achieved.

Some embodiments of the present disclosure further provide a terminal. The terminal includes: a storage, a processor and a computer program stored in the storage and executable by the processor, when the computer program is executed by the processor, the processor implements various processes in the foregoing embodiment of the method of receiving information applied at a terminal side, and the same technical effect can be achieved, which will not be repeated herein to avoid repetition.

Some embodiments of the present disclosure also provide a computer readable storage medium, wherein a computer program is stored on the computer readable storage medium, and when the computer program is executed by a processor, the processor implements various processes in the foregoing embodiment of the method of receiving information applied at a terminal side, and the same technical effect can be achieved, which will not be repeated herein to avoid repetition. The computer readable storage medium may be, for example, a Read-Only Memory (ROM), a Random Access Memory (RAM), a magnetic disk or an optical disk, etc.

Figure 10:
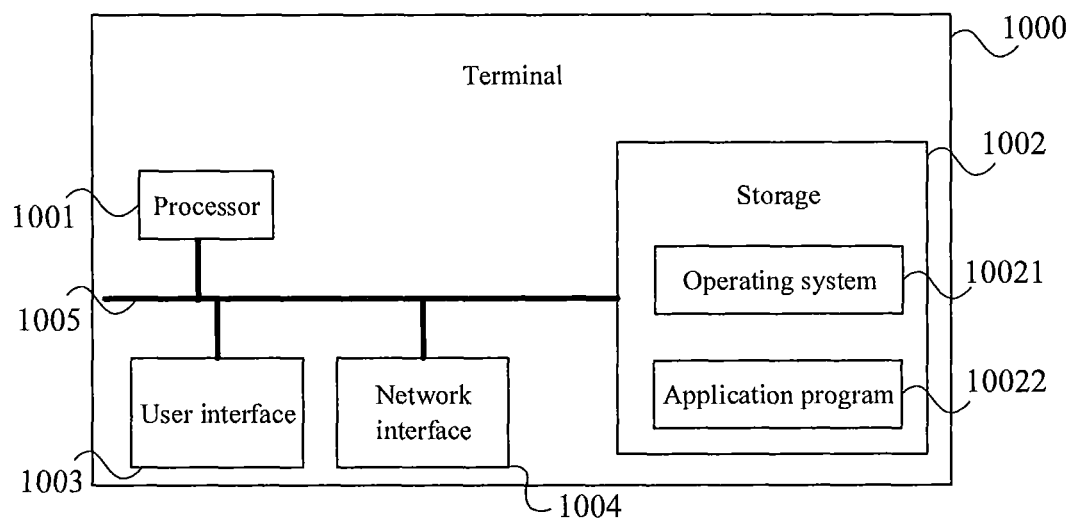
FIG. 10 is a structural block diagram of a terminal according to some embodiments of the present disclosure.

As shown in FIG. 10, a structure of a terminal according to some embodiments of the present disclosure is illustrated. An application entity to which the method of receiving information of the present disclosure is applied will be specifically described below with reference to the figure.

The terminal 1000 shown in FIG. 10 includes: at least one processor 1001, a storage 1002, at least one network interface 1004 and a user interface 1003. The various components in terminal 1000 are coupled together by a bus system 1005. It will be appreciated that the bus system 1005 is used to enable connection communication among these components. The bus system 1005 includes a power bus, a control bus, a status signal bus, and a data bus. However, for clarity of description, various buses are labeled as the bus system 1005 in FIG. 10.

The user interface 1003 may include a display, a keyboard, or a pointing device (e.g., a mouse), a track ball, a touchpad, or a touch screen, etc.

It is to be understood that the storage 1002 in the embodiments of the present disclosure can be either a volatile storage or a non-volatile storage, or can include both a volatile storage and a non-volatile storage. The non-volatile storage may be a Read-Only Memory (ROM), a Programmable ROM (PROM), an Erasable PROM (EPROM), an Electrically EPROM (EEPROM) or a flash memory. The volatile storage can be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 1002 of the systems and methods described in the present disclosure is intended to include, but is not limited to, these and any other suitable types of storages.

in some embodiments, the storage 1002 stores following elements, executable modules or data structures, or a subset thereof, or extended set thereof: an operating system 10021 and an application program 10022.

The operating system 10021 includes various system programs, such as a framework layer, a core library layer, a driver layer, and the like, for implementing various basic services and processing hardware-based tasks. The application program 10022 includes various application programs, such as a Media Player, a Browser, and the like, for implementing various application services. A program for implementing the methods of embodiments of the present disclosure may be included in the application program 10022.

In the embodiments of the present disclosure, the mobile terminal 1000 further includes: a computer program stored in the storage 1002 and executable by the processor 1001. Specifically, the program may be a computer-controlled program in the application program 10022. In a case that the computer program is executed by the processor 1001, the processor 1001 implements following steps: acquiring monitoring assistance information of a physical downlink control channel (PDCCH) used to schedule remaining minimum system information (RMSI) monitoring, according to the monitoring assistance information, the PDCCH used to schedule the RMSI, and receiving a corresponding RMSI.

The monitoring assistance information includes preset parameters and/or one or more resource indicators of the PDCCH used to schedule the RMSI and selected by the base station.

The preset parameters include at least two of: the period of the RMSI, a transmission interval of the RMSI, a length of a monitoring window of the PDCCH, and an offset of the monitoring window of the PDCCH.

The above method disclosed in the embodiments of the present disclosure may be applied to the processor 1001 or implemented by the processor 1001. The processor 1001 may be an integrated circuit chip having a capability of processing signals. In an implementation process, each step of the foregoing method may be completed by an integrated logic circuit of hardware or by an instruction in a form of software in the processor 1001. The processor 1001 may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Various methods, steps, and logical block diagrams disclosed in the embodiments of the present disclosure may be implemented or carried out. The general purpose processor may be a microprocessor, any conventional processor, etc. The steps of the method disclosed in the embodiments of the present disclosure may be embodied directly by a hardware decoding processor, or by a combination of hardware and software modules in the hardware decoding processor. The software modules may reside in well-established computer readable storage medium in the art, such as a RAM, a flash memory, a ROM, a PROM, an EEPROM, a register. The computer readable storage medium resides in the storage 1002. The processor 1001 reads information from the storage 1002 and performs the steps of the methods with hardware in the processor. Specifically, a computer program is stored on the computer readable storage medium. In a case that the computer program is executed by the processor 1001, the following steps are implemented.

It is to be understood that the embodiments described in embodiments of the present disclosure may be implemented in hardware, software, firmware, middleware, microcode, or any combination thereof. For hardware implementation, processing units may be implemented in one or more of an Application Specific Integrated. Circuit (ASIC), a Digital Signal Processor (DSP), a DSP device (DSPD), a Programmable Logic Device (PLD), a Field Programmable Gate Array (FPGA), a general purpose processor, a controller, a microcontroller, a microprocessor, other electronic units used to perform functions described in the present disclosure or a combination thereof.

For software implementation, the techniques described in the present disclosure can be implemented by modules (e.g., procedures, functions, etc.) that perform the functions described in the present disclosure. A software code can be stored in the storage and executed by the processor. The storage can be implemented within the processor or external to the processor.

Optionally, when the computer program is executed by the processor 1001, the processor 1001 implements: acquiring default monitoring assistance information of PDCCH used to schedule the RMSI; and/or receiving the monitoring assistance information, sent by the base station, of the PDCCH used to schedule the RMSI.

Optionally, at least one parameter in the monitoring assistance information is sent by the base station. When the computer program is executed by the processor 1001, the processor 1001 implements: receiving at least one parameter in the monitoring assistance information sent by the base station through a preset message, wherein, the preset message includes at least one of: a master information block (MIB), one or more system information blocks other than the MIB, and radio resource control (RRC) signaling.

Further, the at least one parameter in the monitoring assistance information is indicated in an explicit and/or implicit manner through the preset message.

Specifically, the explicit indication manner through the preset message includes: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

Specifically, the implicit indication manner through the preset message includes: indicating the at least one parameter in the monitoring assistance information by using preset information in the preset message.

The preset information has correspondence relationship with the at least one parameter in the monitoring assistance information.

Optionally, the preset information includes: the period of a synchronization signal block burst set (SS burst set).

Optionally, when the computer program is executed by the processor 1001, the processor 1001 implements: decoding the RMSI according to the received RMSI; and stopping receiving an RMSI after successfully decoding content of the RMSI.

Optionally, when the computer program is executed by the processor 1001, the processor 1001 implements: decoding the RMSI according to a received RMSI; or soft-combining at least two received RMSIs to decode the RMSI.

Optionally, when the computer program is executed by the processor 1001, the processor 1001 implements: re-receiving the RMSI in a case that system information or the content of the RMSI changes.

Optionally, in a case that the monitoring assistance information includes the one or more resource indicators of the PDCCH used to schedule the RMSI and selected by the base station and when the computer program is executed by the processor 1001, the processor 1001 implements: performing, according to the one or more resource indicators of the PDCCH, PDCCH detection on a PDCCH resource selected by the base station.

Optionally, in a case that the monitoring assistance information includes the length of the monitoring window of the PDCCH and the offset of the monitoring window of the PDCCH, and when the computer program is executed by the processor 1001, the processor 1001 implements: finding a starting point of the monitoring window of the PDCCH, according to the offset of the monitoring window of the PDCCH, starting the monitoring window of the PDCCH, searching and detecting the PDCCH in a control resource set within the monitoring window of the PDCCH, stopping searching and detecting the PDCCH in the control resource set after the monitoring window of the PDCCH ends.

Optionally, in a case that the monitoring assistance information includes the period of the RMSI and the transmission interval of the RMSI and when the computer program is executed by the processor 1001, the processor 1001 implements: in the period of the RMSI, after the terminal receives an RMSI, not searching or detecting the PDCCH in the control resource set in a next RMSI interval, but searching and detecting the PDCCH in a control resource set after a transmission interval of the RMSI.

The terminal 1000 can implement various processes implemented by the terminal in the foregoing embodiments and details are not described herein again to avoid repetition.

The terminal of the embodiments of the present disclosure acquires monitoring assistance information of a physical downlink control channel (PDCCH) used to schedule remaining minimum system information (RMSI); monitors, according to the monitoring assistance information, the PDCCH used to schedule the RMSI, and receives the corresponding RMSI. In this way, unnecessary blind detection to the PDCCH performed by the terminal is avoided as much as possible; this way reduces the number of blind detections of the terminal and saves power consumption of the terminal.

Figure 11:
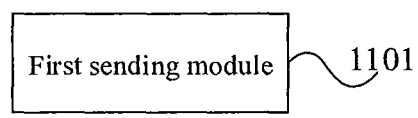
FIG. 11 is a schematic diagram illustrating a module of a base station according to some embodiments of the present disclosure.

As shown in FIG. 11, a base station is provided in some embodiments of the present disclosure. The base station includes: a first sending module 1101, used to send, to one or more terminals, monitoring assistance information of a physical downlink control channel (PDCCH) used to schedule remaining minimum system information (RMSI).

Specifically, the monitoring assistance information includes preset parameters and/or one or more resource indicators of the PDCCH used to schedule the RMSI and selected by the base station.

The preset parameters include at least two of: the period of the RMSI, a transmission interval of the RMSI, a length of a monitoring window of the PDCCH, and an offset of the monitoring window of the PDCCH.

Further, the first sending module is used to: send, to the one or more terminals through a preset message, at least one parameter in the monitoring assistance information.

The preset message includes at least one of: a master information block (MIB), one or more system information blocks other than the MIB and radio resource control (RRC) signaling.

Further, the explicit indication manner through the preset message includes: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

Further, the implicit indication manner through the preset message includes: indicating the at least one parameter in the monitoring assistance information by using preset information in the preset message.

The preset information has correspondence relationship with the at least one parameter in the monitoring assistance information.

Optionally, the preset information includes: the period of a synchronization signal block burst set (SS burst set).

Further, after the first sending module 1101 sends, to one or more terminals, monitoring assistance information of a physical downlink control channel (PDCCH) used to schedule remaining minimum system information (RMSI), the base station further includes: a second sending module, used to send, to the one or more terminals, downlink control information used to schedule the RMSI.

The downlink control information is carried in the PDCCH used to schedule the RMSI, and the downlink control information is used to instruct the one or more terminals to receive RMSI.

Specifically, the second sending module is used to: send, in a case that only a single transmission position of the downlink control information is included in a preset time duration, the downlink control information at the transmission position; or determine, in a case that at least two candidate positions of the downlink control information are included in a preset time duration, the transmission position of the downlink control information from the at least two candidate positions, and send the downlink control information at the determined transmission position.

Further, the base station further includes: a third sending module, used to send at least one RMSI at a preset time interval; or a fourth sending module, used to send at least one RMSI within a preset time window in the period of the RMSI.

It should be noted that the embodiment of the base station is a base station corresponding to the above-mentioned method of sending information applied to the base station side. All implementations of the above embodiments are applicable to the embodiment of the base station, and the same technical effects may be achieved.

Some embodiments of the present disclosure further provide a base station. The base station includes: a storage, a processor and a computer program stored in the storage and executable by the processor. When the computer program is executed by the processor, the processor implements various processes in the foregoing embodiments of the method of sending information applied at a base station side, and the same technical effect can be achieved, which will not be repeated herein to avoid repetition.

Some embodiments of the present disclosure also provide a computer readable storage medium, wherein a computer program is stored on the computer readable storage medium, and when the computer program is executed by a processor, the processor implements various processes in the foregoing embodiments of the method of sending information applied at a base station side, and the same technical effect can be achieved, which will not be repeated herein to avoid repetition. The computer readable storage medium may be, for example, a Read-Only Memory (ROM), a Random Access Memory (RAM), a magnetic disk or an optical disk, etc.

Figure 12:
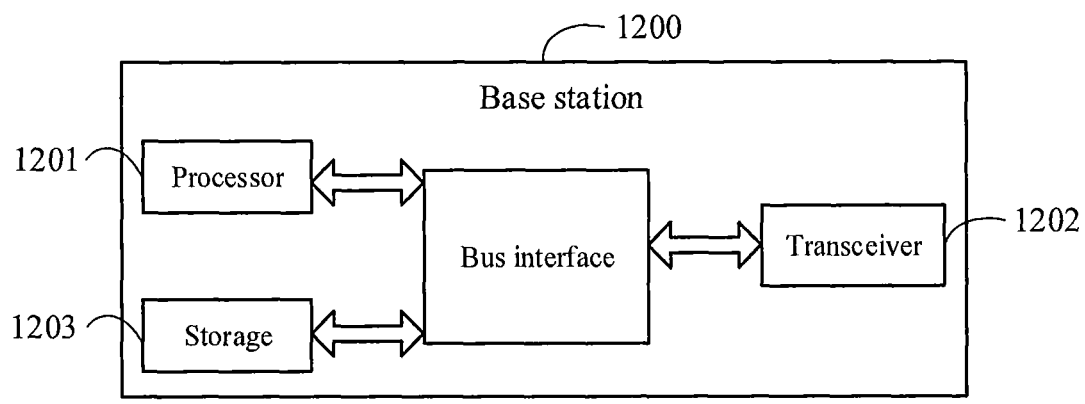
FIG. 12 is a structural diagram of a base station according to some embodiments of the present disclosure.

FIG. 12 is a structural diagram illustrating a base station according to some embodiments of the present disclosure, which can implement the details of the method of sending information applied at a base station side, and the same technical effect can be achieved. As shown in FIG. 12, the base station 1200 includes: a processor 1201, a transceiver 1202, a storage 1203 and a bus interface.

The processor 1201 is further used to read a program in the storage 1203 and execute a following step: sending, to one or more terminals through the transceiver 1202, monitoring assistance information of a physical downlink control channel (PDCCH) used to schedule remaining minimum system information (RMSI).

The monitoring assistance information includes preset parameters and/or one or more resource indicators of the PDCCH used to schedule the RMSI and selected by the base station.

The preset parameters include at least two of: the period of the RMSI, a transmission interval of the RMSI, a length of a monitoring window of the PDCCH, and an offset of the monitoring window of the PDCCH.

In FIG. 12, a bus architecture may include any number of interconnected buses and bridges. Various circuits, specifically, one or more processors represented by the processor 1201 and a storage represented by the storage 1203, are linked together. The bus architecture may also link various other circuits such as peripheral devices, voltage regulators and power management circuits, which are well known in the art, and therefore a further description thereof is omitted herein. A bus interface provides interfaces. The transceiver 1202 may be a plurality of elements, that is, includes a transmitter and a receiver, for providing units used to communicate with various other apparatuses over a transmission medium.

The processor 1201 is responsible for managing the bus architecture and general processing, and the storage 1203 can store data used by the processor 1201 when the processor 1201 performs operations.

Optionally, the processor 1201 is used to read the program in the storage 1203 and execute: sending, to one or more terminals through the transceiver 1202, monitoring assistance information of a physical downlink control channel (PDCCH) used to schedule remaining minimum system information (RMSI).

Optionally, the processor 1201 is used to read the program in the storage 1203 and execute: sending, to the one or more terminals through a preset message, at least one parameter in the monitoring assistance information.

The preset message includes at least one of: a master information block (MIB), one or more system information blocks other than the MIB, and radio resource control (RRC) signaling.

Further, the monitoring assistance information includes at least one of: the period of the RMSI, a transmission interval of the RMSI, a length of a monitoring window of the PDCCH, an offset of the monitoring window of the PDCCH and one or more resource indicators of the PDCCH used to schedule the RMSI and selected by the base station.

Specifically, the explicit indication manner through the preset message includes: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

Specifically, the implicit indication manner through the preset message includes: indicating the at least one parameter in the monitoring assistance information by using preset information in the preset message.

The preset information has correspondence relationship with the at east one parameter in the monitoring assistance information.

Optionally, the preset information includes: the period of a synchronization signal block burst set (SS burst set).

Optionally, the processor 1201 is used to read the program in the storage 1203 and execute: sending, to the one or more terminals, downlink control information used to schedule the RMSI.

The downlink control information is carried in the PDCCH used to schedule the RMSI, and the downlink control information is used to instruct the one or more terminals to receive RMSI.

Optionally, the processor 1201 is used to read the program in the storage 1203 and execute: sending, in a case that only a single transmission position of the downlink control information is included in a preset time duration, the downlink control information at the transmission position; or determining, in a case that at least two candidate positions of the downlink control information are included in a preset time duration, the transmission position of the downlink control information from the at least two candidate positions, and sending the downlink control information at the determined transmission position.

Optionally, the processor 1201 is used to read the program in the storage 1203 and execute: sending at least one RMSI at a preset time interval; or sending at least one RMSI within a preset time window in the period of the RMSI.

The base station in the embodiments of the present disclosure avoids unnecessary blind detection to the PDCCH performed by the terminal as much as possible; this method reduces the number of blind detections of the terminal and saves power consumption on the terminal side.

Various embodiments in this specification are described in a progressive manner. Each of the embodiments focuses on differences from other embodiments, and the same or similar parts among the various embodiments may be obtained by referring to each other.

Those skilled in the art will appreciate that the embodiments of the present disclosure may be provided as a method, an apparatus, or a computer program product. Accordingly, the embodiments of the present disclosure may take a form of an entirely hardware embodiment, an entirely software embodiment, or an embodiment combining software and hardware aspects. Moreover, the embodiments of the present disclosure may use the form of a computer program product implemented on one or more computer usable storage medium (including but not limit to a disk memory, a CD-ROM, an optical memory, etc.) including programming codes that can be executed by computers.

The embodiments of the present disclosure are described with reference to flowcharts and/or block diagrams of methods, terminal devices (systems) and computer program products according to the embodiments of the present disclosure. It will be understood that each flow and/or each block of flowcharts and/or block diagrams and a combination of flows and/or blocks in the flowcharts and/or block diagrams may be implemented by computer program instructions. These computer program instructions can be provided to a processor of a general purpose computer, a special purpose computer, an embedded processor or other programmable data processing terminal device to produce a machine, so that instructions executed by a processor of a computer or another programmable data processing terminal device are caused to produce a device for implementing the functions designated in one or more flows of the flowcharts or in one or more blocks of the block diagrams.

The computer program instructions may also be stored in a computer readable storage that can direct a computer or another programmable data processing terminal device to operate in a particular manner, such that instructions stored in the computer readable storage produce an article of manufacture including an instruction device, and the instruction device implements the functions designated in one or more flows of the flowcharts or in one or more blocks of the block diagrams.

These computer program instructions may also be loaded onto a computer or another programmable data processing terminal device such that a series of operational steps are performed on the computer or another programmable terminal device to produce computer-implemented processing, such that the instructions executed on a computer or another programmable terminal device provide steps for implementing the functions designated in one or more flows of the flowcharts or in one or more blocks of the block diagrams.

Although optional embodiments of the present disclosure are already described, once those skilled in the art understand a basic creative concept, they may make additional modifications and alterations to these embodiments. Therefore, the appended claims are intended to be construed as including optional embodiments and all changes and modifications that fall within the scope of the embodiments of the present disclosure.

It should also be noted that, in the present disclosure, relational terms such as first and second, etc. are used merely to distinguish one entity or operation from another, but do not necessarily require or imply any such actual relationship or order between these entities or operations. Furthermore, the terms "comprises" or "comprising" or "including" or any other variations are intended to encompass a non-exclusive inclusion, such that a process, a method, an article, or a terminal device that includes a plurality of elements includes not only those elements but also other elements not explicitly listed, or elements that are inherent to such a process, a method, an article, or a terminal device. An element defined by the phrase "comprising a . . . " does not exclude presence of additional identical elements in the process, method, article, or terminal device that includes the element, if without further limitation.

The descriptions above are optional embodiments of the present disclosure. It should be noted that, those skilled in the art may also make improvements and embellishments without departing the principle of the present disclosure. The improvements and the embellishments are also within the protection scope of the present disclosure.

What is claimed is:

1. A method of receiving information, applied to a terminal and comprising:
   acquiring monitoring assistance information of a physical downlink control channel (PDCCH) used to schedule remaining minimum system information (RMSI);
   monitoring, according to the monitoring assistance information, the PDCCH used to schedule the RMSI, and receiving a corresponding RMSI;
   wherein the monitoring assistance information comprises preset parameters and/or one or more resource indicators of the PDCCH used to schedule the RMSI and selected by a base station:
   the preset parameters comprise at least two of: the period of the RMSI, a transmission interval of the RMSI, a length of a monitoring window of the PDCCH, and an offset of the monitoring window of the PDCCH;
   wherein, in a ca that the monitoring assistance information comprises the length of the monitoring window of the PDCCH and the offset of the monitoring window of the PDCCH monitoring the PDCCH used to schedule the RMSI comprises:
   finding a staring point of the monitoring window of the PDCCH according to the offset of the monitoring window of the PDCCH,
   staring the monitoring window of the PDCCH searching and detecting the PDCCH in a control resource set within the monitoring window of the PDCCH,
   stopping searching and detecting the PDCCH in the control resource set after the monitoring window of the PDCCH ends.

2. The method of receiving information according to claim 1, wherein, acquiring the monitoring assistance information of the PDCCH used to schedule the RMSI, comprises:
   acquiring default monitoring assistance information of the PDCCH used to schedule the RMSI; and/or
   receiving the monitoring assistance information, sent by the base station, of the PDCCH used to schedule the RMSI;
   wherein at least one parameter in the monitoring assistance information is sent by the base station, receiving the monitoring assistance information, sent by the base station, of the PDCCH used to schedule the RMSI, comprises:
   receiving the at least one parameter in the monitoring assistance information sent through a preset message by the base station;
   wherein, the preset message comprises at least one of: a master information block (MIB), one or more system information blocks other than the MIB, and a radio resource control (RRC) signaling.

3. The method of receiving information according to claim 2, wherein the at least one parameter in the monitoring assistance information is indicated in an explicit manner and/or in an implicit manner through the preset message.

4. The method of receiving information according to claim 3, wherein the explicit indication manner through the preset message comprises: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

5. The method of receiving information according to claim 3, wherein the implicit indication manner through the preset message includes: indicating the at least one parameter in the monitoring assistance information by using preset information in the preset message;
   wherein the preset information has correspondence relationship with the at least one parameter in the monitoring assistance information, the preset information comprises the period of a synchronization signal block burst set.

6. The method of receiving information according to claim 1, wherein, in a case that the monitoring assistance information comprises the one or more resource indicators of the PDCCH used to schedule the RMSI and selected by the base station, monitoring the PDCCH used to schedule the RMSI comprises:
   performing, according to the one or more resource indicators of the PDCCH, PDCCH detection on a PDCCH resource selected by the base station;
   and/or,
   in a case that the monitoring assistance information comprises the period of the RMSI and the transmission interval of the RMSI, monitoring the PDCCH used to schedule the RMSI comprises:
   in the period of the RMSI, after the terminal receives an RMSI, not searching or detecting the PDCCH in the control resource set in a next transmission interval of the RMSI by the terminal, but searching and detecting the PDCCH in the control resource set after the transmission interval of the RMSI.

7. The method of receiving information according to claim 1, wherein, after monitoring, according to the monitoring assistance information, the PDCCH used to schedule the RMSI; and receiving a corresponding RMSI the method further comprises:
   decoding the RMSI according to the received RMSI;
   stopping receiving the RMSI after successfully acquiring contents of the RMSI through the decoding.

8. The method of receiving information according to claim 7, wherein, decoding the RMSI according to the received RMSI, comprises:
   decoding the RMSI according to the received RMSI; or
   performing soft-combining and decoding on at least two received RMSIs;
   and/or, after stopping receiving the RMSI after successfully acquiring contents of the RMSI through the decoding, the method further comprises:
re-receiving the RMSI in a case that system information or the contents of the RMSI changes.

9. A method of sending information, applied to a base station and comprising:
sending, to one or more terminals, monitoring assistance information of a physical downlink control channel (PDCCH) used to schedule remaining minimum system information (RMSI);
wherein the monitoring assistance information comprises preset parameters and/or one or more resource indicators of the PDCCH used to schedule the RMSI and selected by the base station;
the preset parameters comprise at least two of the period of the RMSI, a transmission interval of the RMSI, a length of a monitoring window of the PDCCH, and an offset of the monitoring window of the PDCCH;
wherein, in a case that the monitoring assistance information comprises the length of the monitoring window of the PDCCH and the offset of the monitoring window of the PDCCH monitoring, by the terminal, the PDCCH used to schedule the RMSI comprises:
finding a starting point of the monitoring window of the PDCCH according to the offset of the monitoring window of the PDCCH,
staring the monitoring window of the PDCCH, searching and detecting the PDCCH in a control resource set within the monitoring window of the PDCCH,
stopping searching and detecting the PDCCH in the control resource set after the monitoring window of the PDCCH ends.

10. The method of sending information according to claim 9, wherein, sending, to the one or more terminals, the monitoring assistance information of the PDCCH used to schedule the RMSI, comprises:
sending, to the one or more terminals through a preset message, at least one parameter in the monitoring assistance information;
wherein the preset message comprises at least one of: a master information block (MIB), one or more system information blocks other than the MIB, and radio resource control (RRC) signaling.

11. The method of sending information according to claim 10, wherein the at least one parameter in the monitoring assistance information is indicated in an explicit manner and/or in an implicit manner through the preset message.

12. The method of sending information according to claim 11, wherein the explicit indication manner through the preset message comprises: jointly indicating the at least one parameter in the monitoring assistance information by using one or more first preset bits in the preset message, or indicating respectively the at least one parameter in the monitoring assistance information by using one or more second preset hits having a same number or different numbers in the preset message.

13. The method of sending information according to claim 11, wherein the implicit indication manner through the preset message comprises: indicating the at least one parameter in the monitoring assistance information by using preset information in the preset message;
the preset information has correspondence relationship with the at least one parameter in the monitoring assistance information, the preset information comprises the period of a synchronization signal block burst set.

14. The method of sending information according to claim 9, wherein, after sending, to the one or more terminals, the monitoring assistance information of the PDCCH used to schedule the RMSI, the method further comprises:
sending, to the one or more terminals, downlink control information used to schedule the RMSI;
wherein the downlink control information is carried in the PDCCH used to schedule the RMSI, and the downlink control information is used to instruct the one or more terminals to receive the RMSI.

15. The method of sending information according to claim 14, wherein, sending, to the one or more terminals, downlink control information used to schedule the RMSI comprises:
sending, in a case that only a single transmission position of the downlink control information is comprised in a preset time duration, the downlink control information at the transmission position; or
determining, in a case that at least two candidate positions of the downlink control information are comprised in a preset time duration, the transmission position of the downlink control information from the at least two candidate positions, and sending the downlink control information at the determined transmission position.

16. A terminal, comprising:
a storage, a processor, and a program stored on the storage and executable by the processor, wherein when the program is executed by the processor, the processor implements the following steps:
acquiring monitoring assistance information of a physical downlink control channel (PDCCH) used to schedule remaining minimum system information (RMSI);
monitoring, according to the monitoring assistance information, the PDCCH used to schedule the RMSI, and receiving a corresponding RMSI;
wherein the monitoring assistance information comprises preset parameters and/or one or more resource indicators of the PDCCH used to schedule the RMSI and selected by a base station;
the preset parameters comprise at least two of: the period of the RMSI, a transmission interval of the RMSI, a length of a monitoring window of the PDCCH, and an offset of the monitoring window of the PDCCH;
wherein, in a case that the monitoring assistance information comprises the length of the monitoring window of the PDCCH and the offset of the monitoring window of the PDCCH, monitoring the PDCCH used to schedule the RMSI comprises:
finding a starting point of the monitoring window of the PDCCH according to the offset of the monitoring window of the PDCCH,
starting the monitoring window of the PDCCH, searching and detecting the PDCCH in a control resource set within the monitoring window of the PDCCH,
stopping Searching and detecting the PDCCH in the control resource set after the monitoring window of the PDCCH ends.

17. The terminal according to claim 16, wherein, acquiring the monitoring assistance information of the PDCCH used to schedule the RMSI, comprises:
acquiring default monitoring assistance information of the PDCCH used to schedule the RMSI; and/or
receiving the monitoring assistance information, sent by the base station, of the PDCCH used to schedule the RMSI;
wherein at least one parameter in the monitoring assistance information is sent by the base station, receiving the monitoring assistance information, sent by the base station, of the PDCCH used to schedule the RMSI, comprises:

receiving the at least one parameter in the monitoring assistance information sent through a preset message by the base station;

wherein, the preset message comprises at least one of: a master information block (MIB), one or more system information blocks other than the MIB, and a radio resource control (RRC) signaling.

18. The terminal according to claim 17, wherein the at least one parameter in the monitoring assistance information is indicated in an explicit manner and/or in an implicit manner through the preset message.

19. The terminal according to claim 18, wherein the explicit indication manner through the preset message comprises: jointly indicating the at least one parameter in the monitoring assistance information by using one or more first preset bits in the preset message, or indicating respectively the at least one parameter in the monitoring assistance information by using one or more second preset bits having a same number or different numbers in the preset message.

20. The terminal according to claim 18, wherein the implicit indication manner through the preset message includes: indicating the at least one parameter in the monitoring assistance information by using preset information in the preset message;

wherein the preset information has correspondence relationship with the at least one parameter in the monitoring assistance information, the preset information comprises the period of a synchronization signal block burst set.

* * * * *